US007805246B2

United States Patent
Chakrapani et al.

(10) Patent No.: US 7,805,246 B2
(45) Date of Patent: Sep. 28, 2010

(54) VIEW-INDEPENDENT TAGGING OF GEOSPATIAL ENTITIES IN IMAGES

(75) Inventors: Jai Chakrapani, Sammamish, WA (US); Pragyana K Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 11/924,288

(22) Filed: Oct. 25, 2007

(65) Prior Publication Data

US 2009/0112474 A1 Apr. 30, 2009

(51) Int. Cl.
*G01V 15/00* (2006.01)
(52) U.S. Cl. .............................. 702/5; 702/179; 702/183; 702/188
(58) Field of Classification Search ....................... 702/2, 702/5, 16, 36, 69, 79, 150, 183; 340/995.1; 345/441; 701/214
See application file for complete search history.

(56) References Cited

U.S. PATENT DOCUMENTS

| 6,484,101 | B1 |   | 11/2002 | Lucas et al. |          |
|-----------|----|---|---------|--------------|----------|
| 7,127,453 | B1 |   | 10/2006 | Frazier et al. |        |
| 7,142,196 | B1 |   | 11/2006 | Connor et al. |         |
| 7,302,343 | B2 | * | 11/2007 | Beatty ..................... | 701/214 |
| 2006/0197763 | A1 | * | 9/2006 | Harrison et al. .......... | 345/441 |
| 2006/0229058 | A1 |   | 10/2006 | Rosenberg |            |
| 2006/0238383 | A1 | * | 10/2006 | Kimchi et al. ........... | 340/995.1 |
| 2007/0118508 | A1 |   | 5/2007 | Svendsen |              |
| 2007/0129888 | A1 |   | 6/2007 | Rosenberg |            |
| 2007/0143348 | A1 |   | 6/2007 | Rosenberg |            |
| 2007/0161382 | A1 |   | 7/2007 | Melinger et al. |       |

FOREIGN PATENT DOCUMENTS

| EP | 1315136     | 5/2003 |
|----|-------------|--------|
| JP | 2002188929  | 7/2002 |
| JP | 2005227340  | 8/2005 |
| KR | 20040068767 | 8/2004 |

OTHER PUBLICATIONS

Holmes, "GeoServer 1.6.0-beta2 (Latest branch)" ,Source Forge., Inc., 2007, pp. 1-3.
Simon, et al., "A Mobile Application Framework for the Geospatial Web" , Proceedings of the 16th International Conference on World Wide Web, May 8-12, 2007, Pervasive Web and Mobility, ACM, pp. 381-390.

(Continued)

*Primary Examiner*—Carol S Tsai
*Assistant Examiner*—Felix E Suarez

(57) ABSTRACT

In some aspects, locations of geospatial entities in a map image are identified. A record of entity model-to-tag mappings is accessed so that tag data corresponding to a geospatial entity in the map image can be identified. Both the tag data and an outline surrounding the location of the geospatial entity corresponding to the tag data is displayed on the map image. In other aspects, a user selection of a location on a map image is received. A record of entity models is accessed to identify an entity model corresponding to a geospatial entity at that location on the map image. An outline of the geospatial entity is displayed on the map image and tag data for the geospatial entity is identified. The tag data is also displayed on the map image, and a record mapping the tag data to the identified entity model is created.

19 Claims, 8 Drawing Sheets

OTHER PUBLICATIONS

Wang, et al., "End-User Place Annotation on Mobile Devices: A Comparative Study", CHI 2006 Extended Abstracts on Human Factors in Computing Systems, Apr. 22-27, 2006, Montreal, Canada, ACM Press, pp. 1493-1498.

Schöning, et al., "Interaction of Mobile Camera Devices with Physical Maps", Adjunct Proceedings of Pervasive 2006, May 7-10, 2006, Dublin Ireland, pp. 121-124.

Fitzmaurice, "Situated Information Spaces and Spatially Aware Palmtop Computers", Communications of the ACM, Jul. 1993, vol. 36, No. 7, pp. 39-49.

Schreiber, et al., "The Semantic Web: Ontology-Based Photo Annotation", IEEE Intelligent Systems, May/Jun. 2001, pp. 66-74.

"PCT Search Report and Written Opinion", Application No. PCT/US2008/077535, (Mar. 26, 2009), 10 pages.

* cited by examiner

300

VIEW-INDEPENDENT TAGGING OF GEOSPATIAL ENTITIES IN IMAGES

BACKGROUND

Many different mapping programs are currently available, allowing users to view maps on their personal computers, mobile devices, car navigation systems, and so forth. These mapping programs typically provide good top down or bird's eye view images. However, it is oftentimes difficult for users to identify particular locations or particular buildings in these images as the users are typically at ground level. Additionally, the exact image region that corresponds to a particular location or building is dependent on the view of the image. This prevents information regarding the location or building identified in one view from being transferred to a different image or map of the same location or building.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the tagging geospatial entities in images, locations of geospatial entities in a map image are identified. A record of entity model-to-tag mappings is accessed so that tag data corresponding to a geospatial entity in the map image can be identified. Both the tag data and an outline surrounding the location of the geospatial entity corresponding to the tag data is displayed on the map image.

In accordance with one or more other aspects of the tagging geospatial entities in images, a user selection of a location on a map image is received. A record of entity models is accessed to identify an entity model corresponding to a geospatial entity at that location on the map image. An outline of the geospatial entity is displayed on the map image and tag data for the geospatial entity is identified. The tag data is also displayed on the map image, and a record mapping the tag data to the identified entity model is created.

BRIEF DESCRIPTION OF THE DRAWINGS

The same numbers are used throughout the drawings to reference like features.

DETAILED DESCRIPTION

In the tagging geospatial entities in images discussed herein, a record mapping geospatial entities to physical locations is maintained. This record can also include geospatial data corresponding to the geospatial entities. When a map image is displayed, this record is accessed and any geospatial data corresponding to geospatial entities being displayed on the map image is also displayed on top of the corresponding geospatial entities. Additionally, a user can add new geospatial data to the record by selecting a location on the map image. In response to such a selection, the geospatial entity at that location is identified and an outline around the geospatial entity is displayed. The user can then input the desired geospatial data which in turn is displayed on top of the geospatial entity.

The records maintained map geospatial data (also referred to as tag data) to geospatial entities. These mappings are independent of any particular map image or view that is being displayed to the user. These mappings are also independent of the particular display device on which particular map images may be displayed. The same mappings are thus used across multiple different map images or views, as well as across multiple different display devices.

Figure 1:
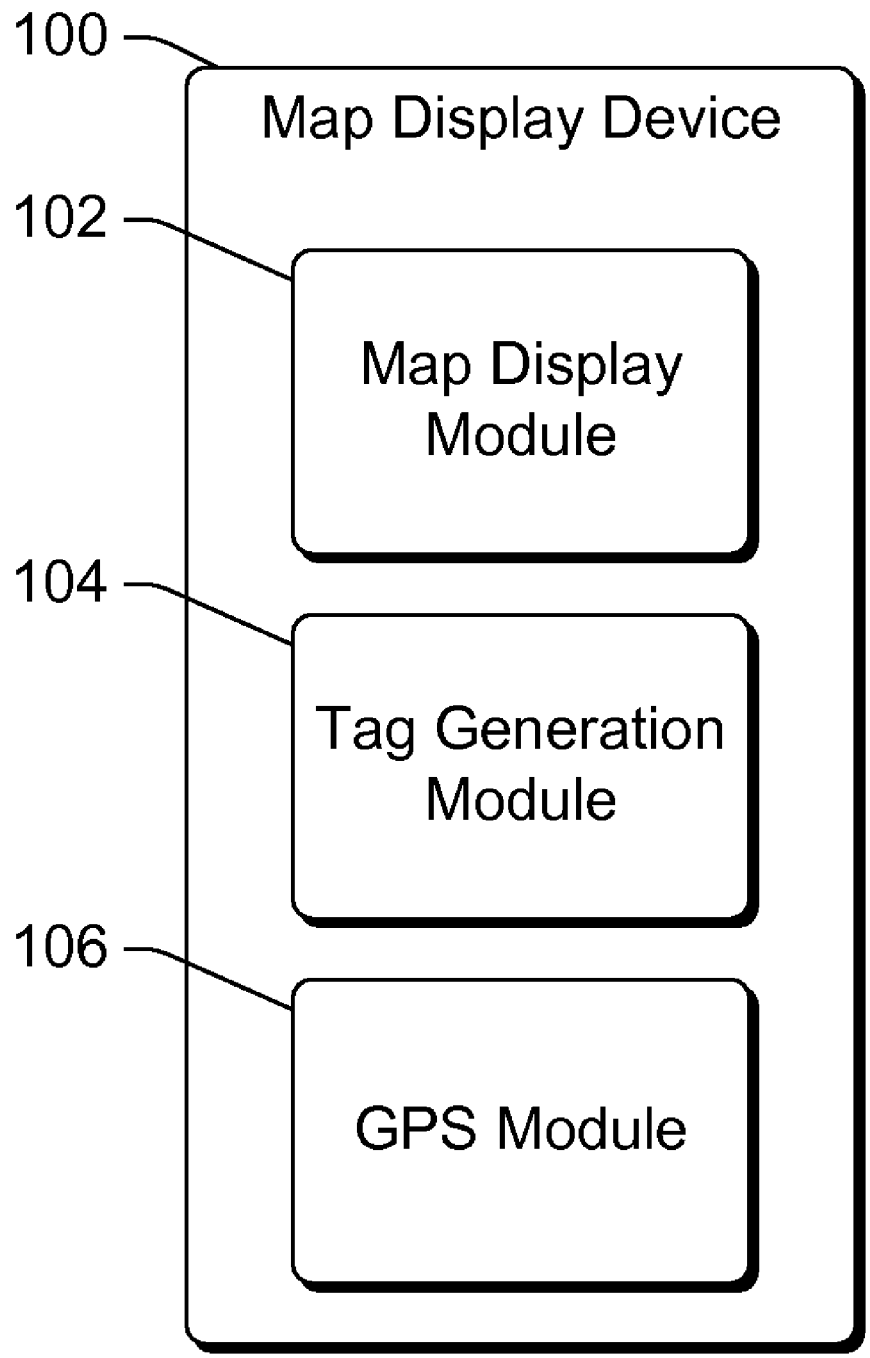
FIG. 1 illustrates an example map display device in which tagging geospatial entities in images can be implemented.

FIG. 1 illustrates an example map display device 100 in which the tagging geospatial entities in images can be implemented. Map display device 100 can be any of a variety of different devices such as a personal computer, a global positioning system (GPS) device, an automotive PC, an automotive navigation system, a handheld computer, a cellular phone, and so forth.

Map display device 100 includes a map display module 102, a tag generation module 104, and a GPS module 106. During operation, GPS module 106 determines a current physical location of device 100 and provides this location to map display module 102. Map display module 102 determines a current map image to be displayed on device 100 based at least in part on the current physical location of device 100. The map image can include multiple geospatial entities. A geospatial entity refers to a physical entity, such as a building, a stadium, a house, a statue, a sign, a parking lot, a lake or pond, a park, a landmark, a bridge, a street, and so forth.

The map image displayed by display module 102 also includes any geospatial data available to map display device 100. Geospatial data, also referred to as tags or tag data, is data that corresponds to and describes a particular geospatial entity. Any information describing the entity, including products and/or services offered by that entity, can be displayed as geospatial data.

Tag generation module 104 manages the creation of new tags. Tag generation module 104 allows a user of map display device 100 to input any desired data as the geospatial data for a geospatial entity being displayed in a map image. The data input by the user is maintained in a record mapping geospatial entities to geospatial data, as discussed in more detail below. Additional geospatial data can also be obtained from other sources such as other systems or devices.

Map image display module 102 can display any of a variety of different types of images as maps. For example, the images can be a top-down view of an area, a bird's eye view of an area, a street map, and so forth. The geospatial data is associated with different geospatial entities rather than particular locations on a particular image, so the same geospatial data can be displayed on multiple different images. The images discussed herein are also referred to as maps or map images, although it is to be appreciated that these images can be any types of images describing any area.

Figure 2:
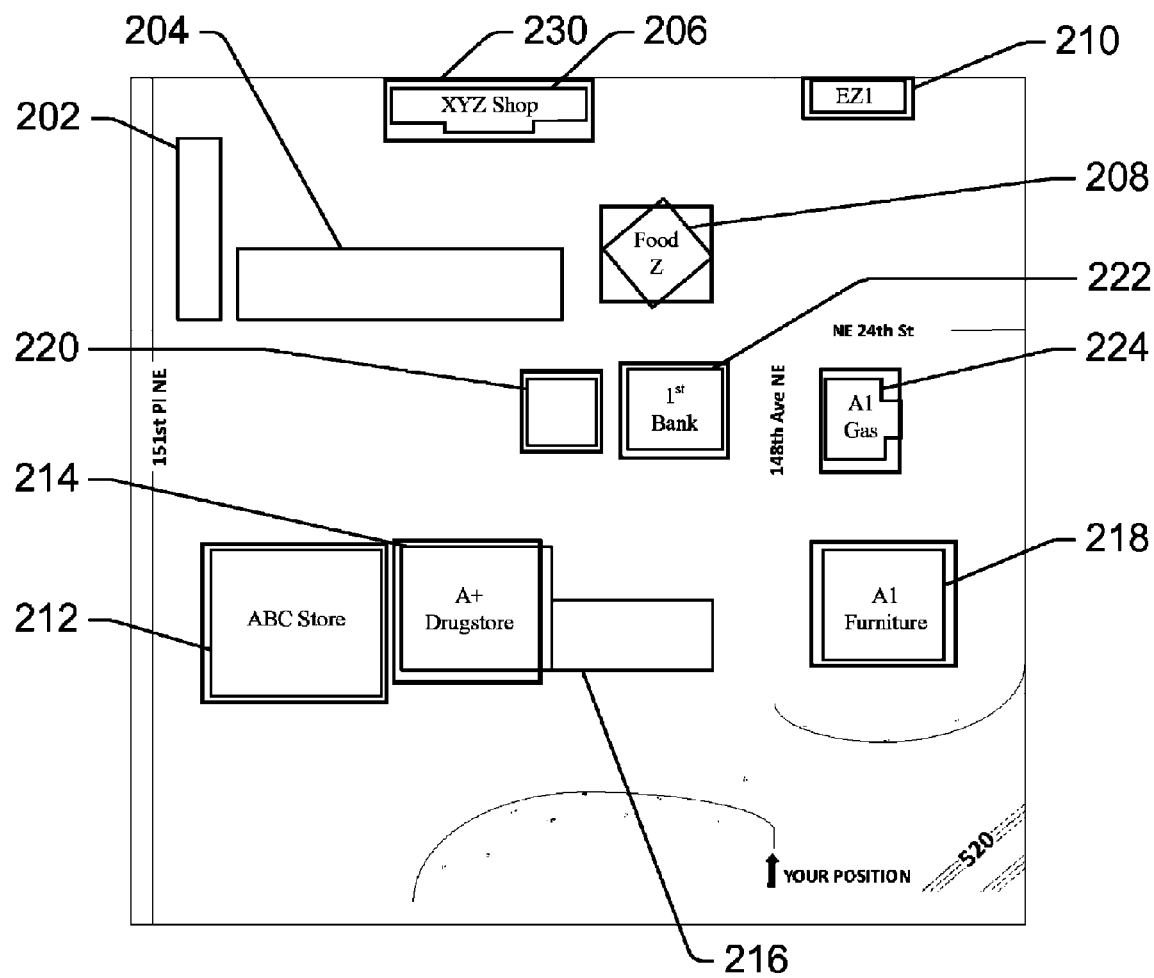
FIG. 2 illustrates an example map image in which multiple geospatial entities are displayed.

FIG. 2 illustrates an example map image 200 in which multiple geospatial entities are displayed. Geospatial data is also displayed in map image 200. As can be seen in FIG. 2, the geospatial data can assist users in knowing their location and the geospatial entities around them. Examples of this geospatial data shown in image 200 include "XYZ Shop", "Food Z", "EZ1", "1$^{st}$ Bank", "ABC Store", "A+ Drugstore", "A1 Gas", and "A1 Furniture". It is to be appreciated that this geospatial data is only an example, and that the actual geospatial data will vary based on the particular geospatial entities. For example, company or business specific names can be displayed as the geospatial data, such as "Rite Aid" for a pharmacy operated by Rite Aid Corporation, or "Starbucks" for a coffee store operated by Starbucks Corporation.

Various buildings 202-224 are illustrated in image 200. Some of the buildings have corresponding geospatial data and outlines displayed, while others do not. For example, no geospatial data corresponds to building 202, so none is displayed in image 200. By way of another example, the geospatial data "XYZ Shop" corresponds to building 206, so an outline 230 is displayed around building 206 and the geospatial data "XYZ Shop" is displayed within that outline. One building 220 is also displayed with an outline but no corresponding geospatial data. Such situations can occur for a variety of reasons, such as geospatial data having been previously generated corresponding to building 202 but was subsequently deleted.

Figure 3:
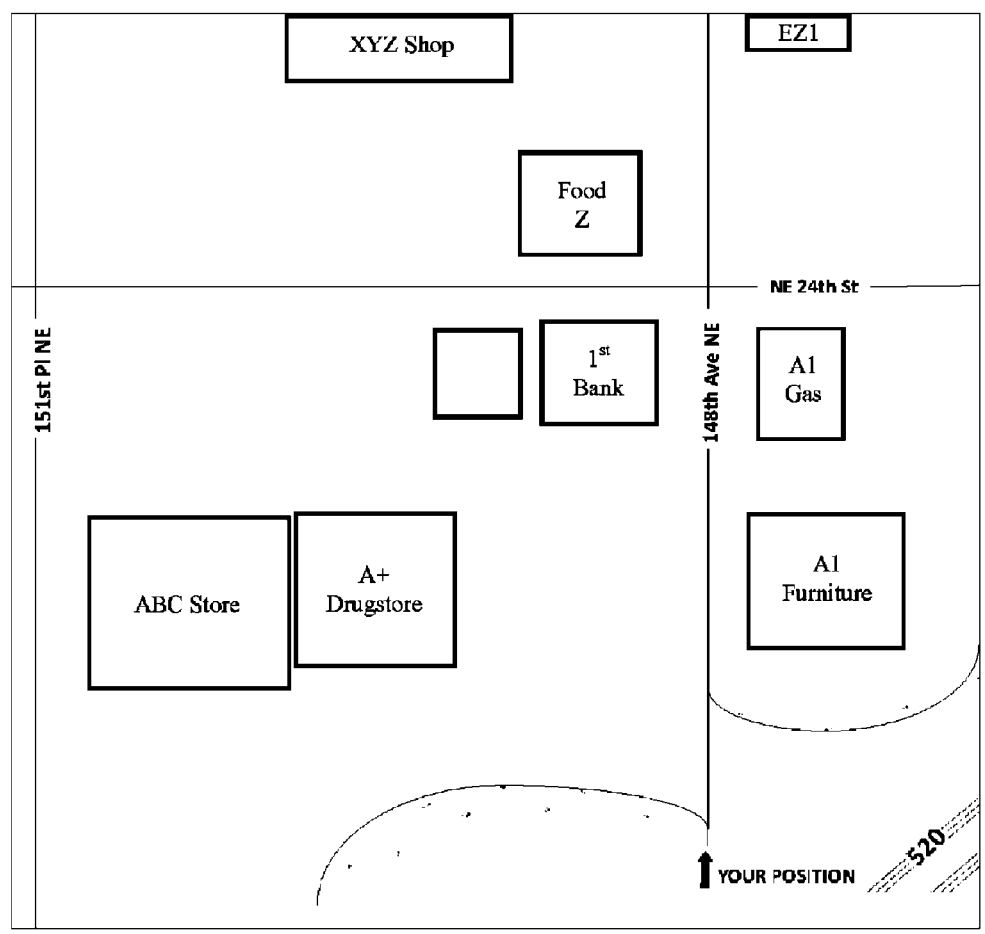
FIG. 3 illustrates another example map image.

FIG. 3 illustrates another example map image 300. Map image 300 is an image of the same general location as displayed in map image 200, although it is a different type of map. Map image 300 is a sketch of a street network. Map image 300 displays a street map without any geospatial entities being displayed. However, the geospatial data corresponding to the geospatial entities that exist at particular locations is displayed.

Figure 4:
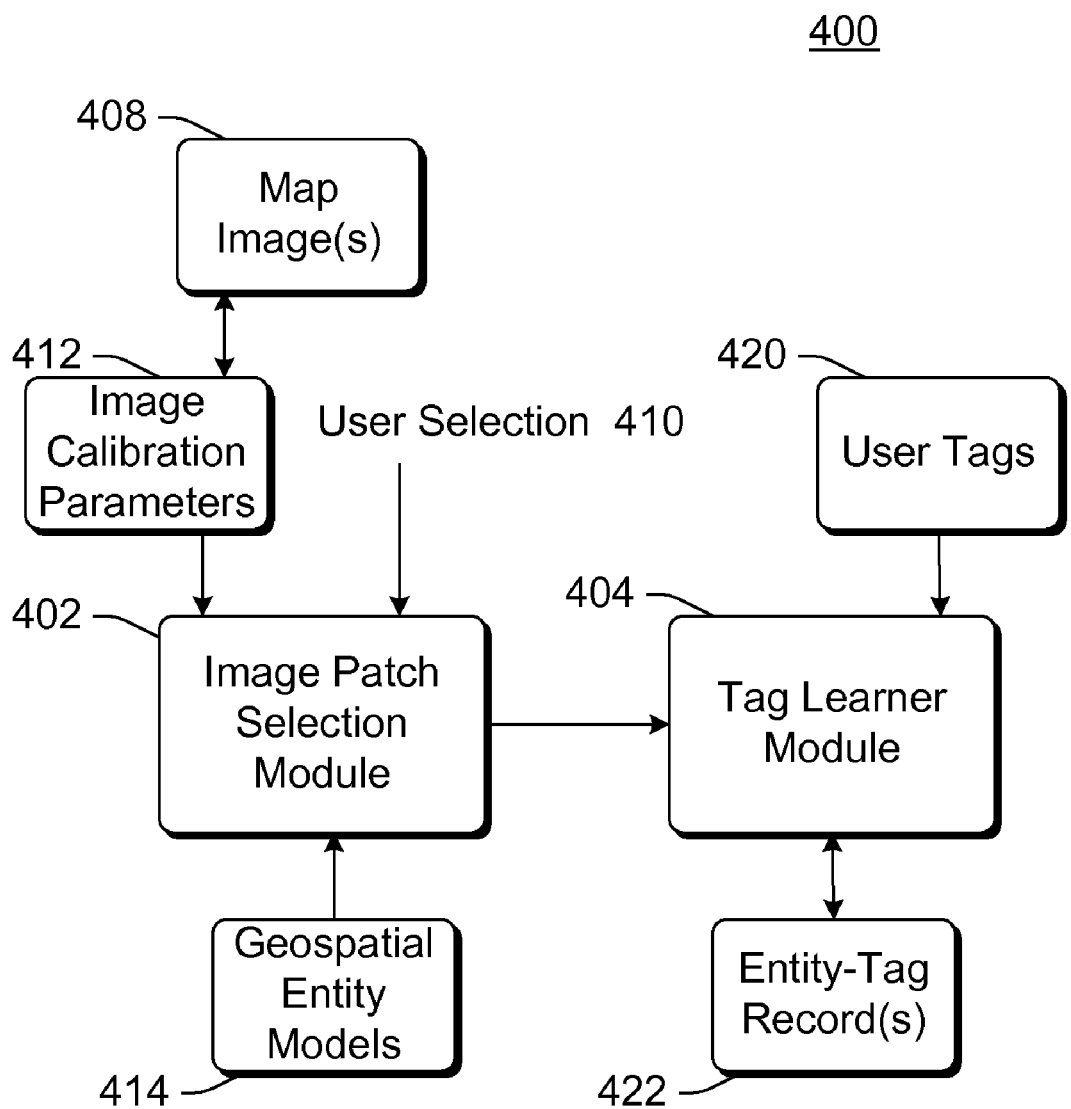
FIG. 4 illustrates an example system for creating tags in map images.

FIG. 4 illustrates an example system 400 for creating tags in map images. System 400 includes an image patch selection module 402 and a tag learner module 404. Although two separate modules 402 and 404 are illustrated in FIG. 4, it is to be appreciated that the functions of these modules 402 and 404 could alternatively be combined into a single module, or alternatively separated into three or more modules.

During operation, one or more map images 408 are displayed to a user. The user makes a selection 410 of a location on the map image that he or she would like to tag. This user selection can be made in any of a variety of different manners. For example, the user can select a location by touching a touchscreen with a finger, stylus, pen, and so forth. By way of another example, the user may select a location by manipulating a cursor or pointer using a cursor control device such as a mouse, joystick, trackpad, buttons or keys, and so forth. By way of yet another example, the user may select a location by speaking voice commands. Regardless of the manner in which the user selection is made, the user selection is input to image patch selection module 402.

Image calibration parameters 412 are also input to image patch selection module 402. Image calibration parameters 412 identify how the map image(s) 408 correspond to the physical world. These image calibration parameters 412 associate each map image with a particular location in the physical world. The parameters 412 can take any of a variety of different forms, such as GPS coordinates or other public or proprietary location information. Image calibration parameters 412 are typically generated or captured when the image itself is captured, although they may alternatively be added at a later time.

Geospatial entity models 414 are also input to image patch selection module 402. Geospatial entity models 414 can be any of a variety of different spatial indexing mechanisms that identify particular geospatial entities. These models 414 also include an indication of the location of each geospatial entity in the physical world. In one or more embodiments, geospatial entity models 414 are 3-dimensional models of the geospatial entities. Alternatively, geospatial entity models 414 can be other mechanisms, such as sets of coordinates (e.g., GPS coordinates and a surrounding radius or other parameters describing other geometric shapes).

Given the user selection 410, the image calibration parameters 412, and the geospatial entity models 414, image patch selection module 402 can readily identify a particular patch or portion of the image 408 being displayed that includes a geospatial entity at the location (or approximate location) that the user selected as follows. Given the image calibration parameters 412, the location of map image 408 in the physical world is known. Given this known location, the geospatial entity models 414 can be projected onto the map image 408 being displayed in any of a variety of conventional manners. Alternatively, the location of the user's selection on the map image 408 being displayed can be projected onto a plane that includes the geospatial entity models 414 in any of a variety of conventional manners. In this manner, the particular geospatial entity model of models 414 that corresponds to the location selected by the user (the image patch) can be readily determined. The geospatial entity model of models 414 that corresponds to the location selected by the user is the geospatial entity model that exists at the physical location that was identified by the user's selection. If no geospatial entity model corresponding to the location selected by the user is found, then the geospatial entity model that is physically closest to the physical location that was identified by the user's selection can be determined to be the model that corresponds to the user's selection. Alternatively, an indication that no model exists and/or that the user may want to enter another selection can be presented to the user.

Image patch selection module 402 also displays an outline on the map image 408 being displayed. This outline approximately surrounds the geospatial entity corresponding to the user's selection as it is displayed in the map image 408. The location for this outline can be automatically determined given the location of the geospatial entity on the map image 408 being displayed. In one or more embodiments this outline is rectangular, although alternatively the outline can take any shape. Examples of these outlines can be seen in FIGS. 2 and 3. Displaying this outline on the map image 408 provides feedback to the user of the particular geospatial entity that corresponds to his or her selection. This allows the user to quickly determine if the desired entity has been selected for tagging, and select a different location on the map image 408 if it is not the desired entity.

It should be noted that, in system 400 the user can simply touch a particular location where a geospatial entity is displayed in a map image in order to tag that entity. The user need not describe an outline of the geospatial entity; rather, system 400 automatically identifies the geospatial entity based on the user selection.

Image patch selection module 402 indicates the particular image patch and geospatial entity model to image patch to tag learner module 404. Tag learner module 404 receives a user tag 420 and associates the received user tag 420 with the geospatial entity model. In this manner, the tag entered by the user is associated with the particular model of the geospatial entity being tagged, rather than with a particular location or region on map image 408.

Tag learner module 404 adds a record of the mapping of the user tag to the geospatial entity model to entity-tag record(s) 422. In one or more embodiments, each entity-tag record stored in record(s) 422 identifies a particular geospatial entity model and particular tag data for that geospatial entity. These records are thus also referred to as model-to-tag mappings. Various other information may also be included in one or more records 422, as discussed in more detail below.

In one or more embodiments, tag learner module 404 manages the tag data received, and determines which data is to correspond to which particular geospatial entities as appropriate. In situations where the geospatial entity being tagged does not have any corresponding tag, the user tag is stored as the tag for the geospatial entity. If the situation arises where the geospatial entity being tagged already has been tagged with a different tag, tag learner module 404 can resolve the situation in any of a variety of different manners.

In one or more embodiments tags can be classified as either trusted or untrusted. Certain sources of tag data can be deemed to be trusted, while other sources of tag data can be deemed to be untrusted. These sources can be particular users and/or other data sources, such as businesses, databases, and so forth. Tag data from a trusted source is given priority over tag data from an untrusted source. So, any tag data received from a trusted source is used as the tag for the geospatial entity, and any tag data received from an untrusted is ignored if it conflicts with tag data received from a trusted source. Alternatively, rather than ignoring the tag data when it conflicts with tag data received from a trusted source, the tag data can be validated against the tag data received from the trusted source. This validation could be, for example, selecting the tag data to be displayed as corresponding to a geospatial entity based on priority levels, votes, and so forth as discussed in more detail below. This validation could also take other forms, such as comparing the tag data to the tag data received from the trusted source to determine the differences (e.g., and attempt to identify typographical errors or minor differences in the tag data), maintaining the tag data in a private set of records as discussed in more detail below, and so forth.

Even with trusted sources, situations can arise where different tag data is received for the same geospatial entity from different trusted (or alternatively untrusted) sources. For example, two different users may attempt to tag the same geospatial entity with two different tags. These situations are resolved by tag learner module 404 in any of a variety of different manners. In one or more embodiments, different sources are assigned different priority levels, and the source with a higher priority level has its tag data used. For example, businesses and/or corporate databases may be assigned a higher priority level than users. Alternatively, a record of the different tag data possibilities for the same geospatial entity can be maintained (e.g., as part of records 422) and users can be allowed to vote on which tag data is the correct data. In other alternatives, the number of users tagging the geospatial entity with a particular tag can be taken into account in determining the proper tag for the geospatial entity. For example, if 30 people input a first tag for a particular geospatial entity and only two people input a second tag for that same geospatial entity, then the first tag would be used.

In embodiments where different sources of tag data can be identified as being trusted, the manner in which a particular source is determined to be trusted can vary. For example, tag learner module 404 can be programmed or otherwise configured to identify particular users or other sources that are trusted. This programming or configuring can be performed for example by an administrator of system 400.

Each record of entity-tag records 422 can store any of a variety of information as the tag data, as well as other information in addition to the tag data. The tag data can include user tags 420, as well as data received from other sources. For example, each record 422 can include different tag data that has been input for the geospatial entity by different sources, vote counts for different tag data for the geospatial entity, the name of the business operating at the geospatial entity's location, address information for the geospatial entity, phone number information for the geospatial entity, logos or other images representing the geospatial entity, product or service information describing products or services offered by the business operating at the geospatial entity's location, pricing information for products or services offered by the business operating at the geospatial entity's location, advertisements, coupons, local sales information, yellow pages information, and so forth.

In addition to tags input by the user, tags can also be obtained from other sources. For example, other systems or devices can be accessed, such as over the Internet or locally, and tag data can be obtained from these other systems or devices. Different businesses can maintain databases or other records of tag data as well as an indication of the geospatial entity models to which that tag data corresponds. These databases or other records can be made available to tag learner module 404 and used as a source of tag data. By way of another example, files of tag data and corresponding geospatial entities can be made available to tag learner module 404, and the data within these files used as the tag data. These files can be made available from a company managing system 400, other companies and businesses, and so forth. By way of yet another example, the tag data included in a record 422 can be a link to another system or device. Various links, such as hyperlinks, can be used to identify where the tag data to be displayed is to be obtained. Thus, this link is maintained in record 422 rather than the actual tag data to be displayed.

It should be noted that although geospatial entity models 414 and entity-tag records 422 are illustrated separately, they alternatively may be combined into the same models. For example, the tag data as well as any other data that may be stored in a record 422 can alternatively be stored in a same data structure as the geospatial entity models are stored in.

In one or more embodiments, multiple sets of records 422 can be maintained. These multiple sets can include, for example, a global set of records as well as private sets of records for different users. By maintaining a private set of records, a user of system 400 is able to input his or her own tags that are displayed back to him or her, but are not made available to other users. Alternatively, the user could specify particular users that his or her private tags are made available to (e.g., a list of friends or buddies, particular user groups, and so forth). In such embodiments, tag data entered by a user can be handled in a variety of different manners. For example, the new tag data can be entered in his or her private set of records rather than the global set of records, the user may be given the option to select whether the tag data is to be entered in his or her private set of records or the global set of records, the new tag data may be entered in the global set of records if no tag data for this particular geospatial entity has been entered yet but entered in his or her private set of records only if tag data has already been entered for this particular geospatial entity (or entered into his or her private set of records only if the tag data already entered was obtained from a trusted source), and so forth.

Figure 5:
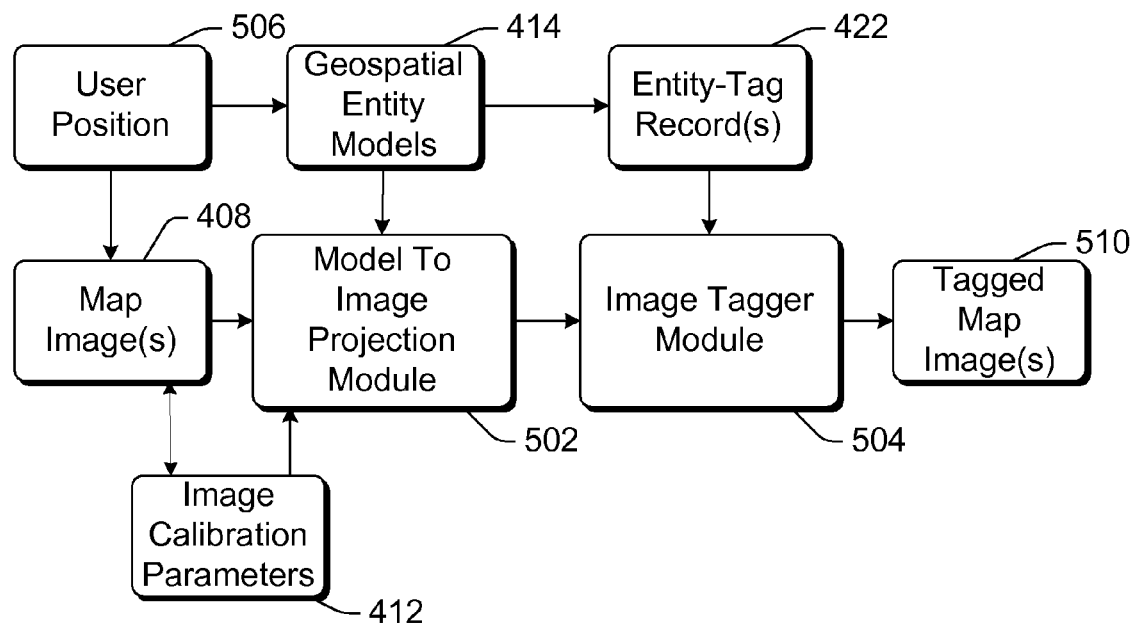
FIG. 5 illustrates an example system for displaying tags.

FIG. 5 illustrates an example system 500 for displaying tags. System 500 includes a model to image projection module 502 and an image tagger module 504. Model to image projection module 502 projects the geospatial entity models 414 onto the map image(s) 408. The map image(s) 408, image calibration parameters 412, geospatial entity models 414, and entity-tag record(s) 422 are the same as those discussed above in FIG. 4. A current user position 506 is received as input. This position can be obtained, for example, from GPS module 106 of FIG. 1 (this assumes that the user has map display device 100 with him or her). The correct map image 408 corresponding to the user's position can be obtained given user position 506. Given the image 408, the image calibration parameters 412, and the geospatial entity models 414, model to image projection module 502 can readily identify the different locations on map image 408 where geospatial entities are being displayed.

The locations of these geospatial entities on map image 408 are provided to image tagger module 504. Image tagger module 504 displays outlines on the map image 408, shown as tagged map image(s) 510, that surround these geospatial entities. The entity-tag records 422 are also accessed to obtain the tags for these geospatial entities being displayed in map image 408. Image tagger module 504 also displays these tags on map image 408, shown as tagged map image(s) 510.

Image tagger module 504 also optionally manages voting for different tag data in situations where different tag data has been input for the same geospatial entity as discussed above. The different tag data options are presented to the user, and tagger module 504 receives the votes from the user. The different tag data options can be automatically presented to the user, or alternatively an indication that multiple different tag data is available can be presented to the user, such as a "vote" label or icon being displayed. If multiple tag data options are available, image tagger module 504 selects one (or alternatively multiple) for display on tagged map image 510. This selection can be made in any of a variety of manners, such as selecting the first tag data that was entered for the geospatial entity, selecting the tag data receiving the most votes, selecting the tag data that is from a trusted source, and so forth. Additionally, image tagger module 504 can record the results of such voting in entity-tag records 422.

It should also be noted that, as discussed above a particular record 422 may store a link to the tag data rather than the actual tag data to be displayed. In such situations, image tagger module 504 accesses the location identified in the record 422 and obtains the tag data to be displayed from that identified location.

Figure 6:
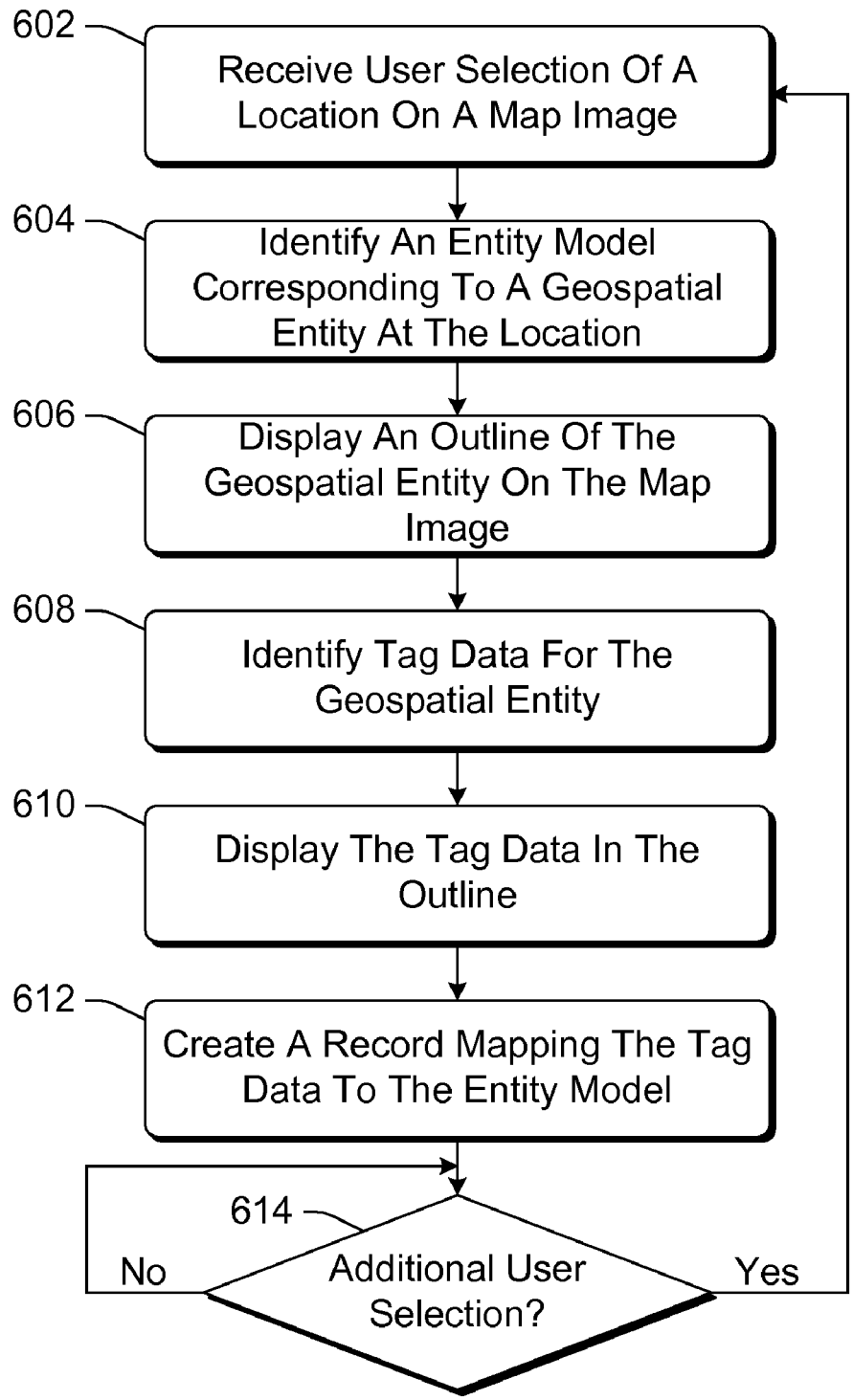
FIG. 6 is a flowchart illustrating an example process for inputting tags in accordance with one or more embodiments.

FIG. 6 is a flowchart illustrating an example process 600 for inputting tags in accordance with one or more embodiments. Process 600 is carried out by, for example, a tag generation module such as module 104 of FIG. 1, or modules 402 and 404 of FIG. 4. Process 600 can be implemented in software, firmware, hardware, or combinations thereof.

Initially, a user selection of a location on a map image is received (act 602). Given this location, an entity model corresponding to the geospatial entity at that location is identified (act 604). This entity model can take any of a variety of different forms, as discussed above. Given the entity model, an outline of the geospatial entity is displayed on the map image (act 606). This outline assists the user by providing feedback identifying the location selected by the user. It should be noted that this outline need not be exact. For example, portions of the outline may lie beyond the geospatial entity, and/or portions of the outline may lie on top of the geospatial entity. The outline is displayed to assist the user in identifying particular geospatial entities. As such, in one or more embodiments the outline is displayed close enough to the geospatial entity that it can help the user identify the geospatial entity.

Tag data for the geospatial entity is also identified (act 608). In one or more embodiments, the identification in act 608 comprises receiving the tag data from the user. Alternatively, the identification can be performed in different manners. For example, the user may identify another system, device, or other location from which the tag data can be obtained, or a default system or device could be accessed to obtain the tag data.

The identified tag data is then displayed in the outline (act 610). This outline in act 610 is the same outline as was displayed in act 606. It should be noted that not all of the tag data need be displayed within the outline. For example, the tag data may be too large to fit within the outline, or the tag data may be off centered so that a portion touches or extends beyond the outline. Alternatively, the tag data may be displayed adjacent to or close to the outline rather than within the outline.

A record mapping the tag data to the entity model is also created (act 612). This record is stored along with the other entity-tag records, such as records 422 in FIGS. 4 and 5. A check is then made as to whether there are any additional user selections (act 614). If there is an additional user selection, process 600 returns to act 602. However, if there are currently no additional user selections, process 600 waits until a selection is made.

Figure 7:
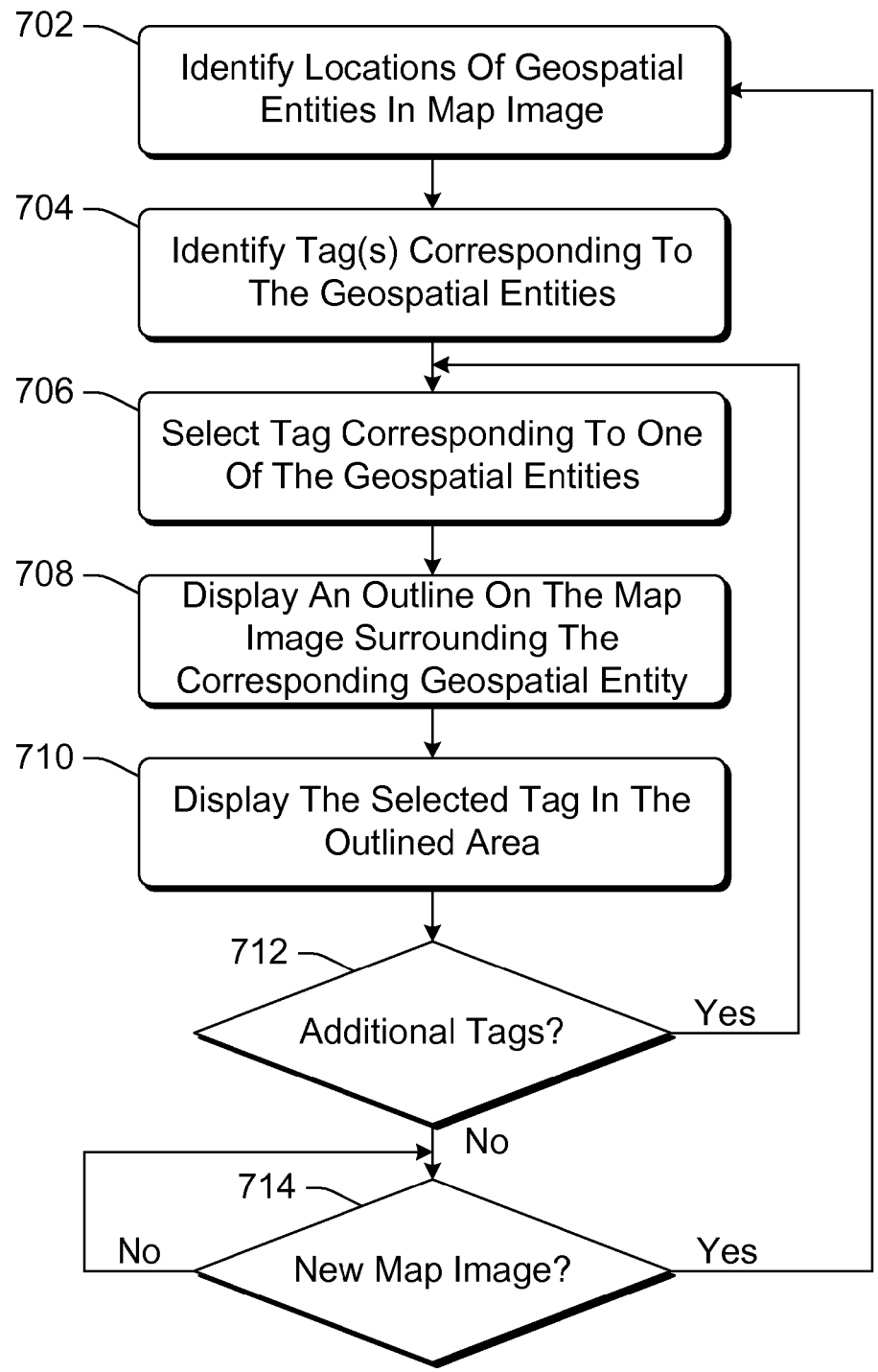
FIG. 7 is a flowchart illustrating an example process for displaying tagged map images in accordance with one or more embodiments.

FIG. 7 is a flowchart illustrating an example process 700 for displaying tagged map images in accordance with one or more embodiments. Process 700 is carried out by, for example, a map display module such as module 102 of FIG. 1, or modules 502 and 504 of FIG. 5. Process 700 can be implemented in software, firmware, hardware, or combinations thereof.

Initially, locations of geospatial entities in a map image are identified (acts 702). The particular map image used in act 702 is based on a current location of the user as discussed above. The tags corresponding to those geospatial entities are also identified (act 704). One of these tags is selected (act 706). The tag selected in act 706 can be selected in any of a variety of manners. For example, tags can be selected randomly, in order of occurrence in record 422 of FIGS. 4 and 5, based on the positions of the geospatial entities in the map image, in order of relevance or category preference specified by user (e.g., tags for buildings first, tags from trusted sources first, etc.), in order of importance in record 422 (such as tags for prominent landmarks and building first), and so forth.

An outline is displayed on the map image surrounding the geospatial entity corresponding to the selected tag (act 708). It should be noted that this outline need not be exact as discussed above with reference to act 606 of FIG. 6.

The selected tag is then displayed in the outlined area (act 710). It should be noted that the tag could overlap the outlined area and/or be adjacent or close to the outlined area as discussed above with reference to act 610 of FIG. 6. Tag data may also include other types of data that is presented to the user in another manner rather than being displayed (e.g., audio data could be played back audibly to the user). A check is then made as to whether there are any additional tags that have not been selected (act 712). If there are any such tags, process 700 returns to select one of those tags (act 706). However, if there are no such additional tags, a check is made as to whether a new map image is present (act 714). Oftentimes process 700 is implemented on a mobile device and the map image is changing as the user moves with the mobile device. Whenever a new map image is displayed to the user process 700 returns to act 702. This allows the display of the tag data to be updated as the map images change.

It should also be noted that different tags can optionally be displayed differently. For example, tags from trusted sources can be displayed in different colors, different fonts, highlighted differently, etc. as tags from untrusted sources. By way of another example, if different tags have been input for the same geospatial entity and voting for a particular tag is occurring, an indication of this voting as well as an option for the user to input his or her vote can also be displayed along with the tag in act 710. These multiple tags and voting information can be displayed in the outlined area or alternatively elsewhere on the map image, or alternatively separately from the map image.

Tagging geospatial entities in images is discussed herein. It should be noted that this tagging can be employed in conjunction with various services. For example, fees could be charged to various companies or businesses to include their tag data in the records 422 of FIGS. 4 and 5. Different fees could be charged based on the type of tag data, such as colorful logos or audio data being charged a higher rate than text. Fees could also be charged if the records include links to the tag data to be displayed. This would allow, for example, companies to purchase the ability to have the most recent prices, sales, offers, and so forth presented to users on the map images.

Figure 8:
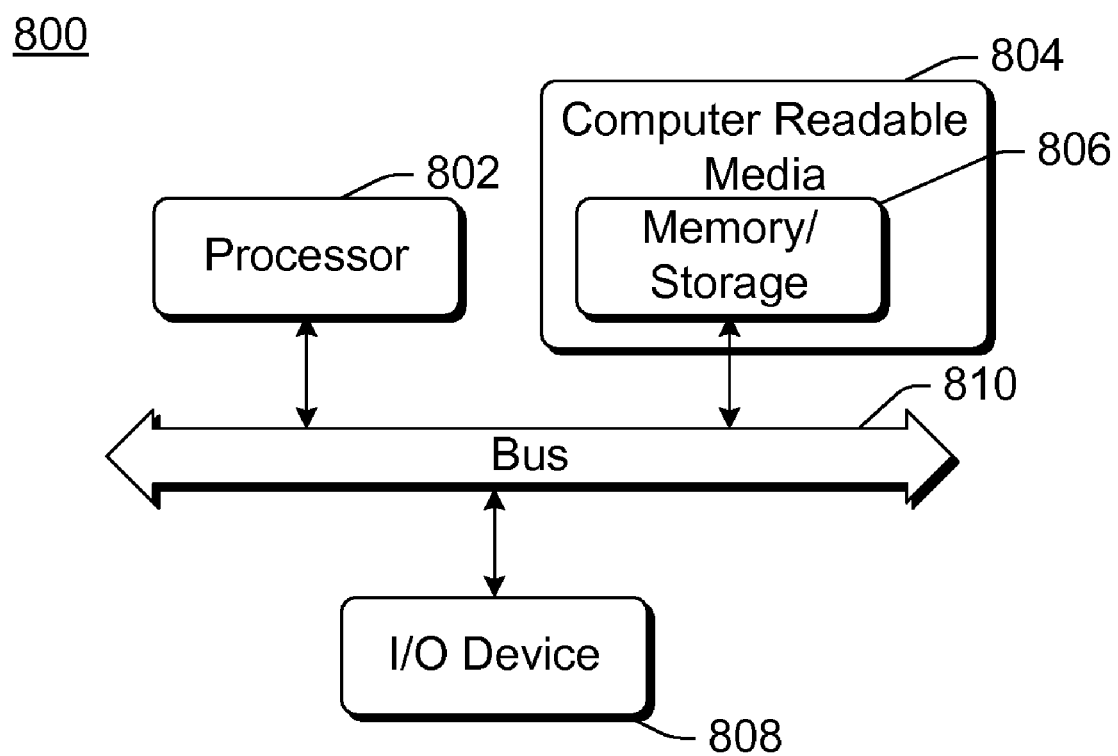
FIG. 8 illustrates an example computing device that can be configured to implement the tagging geospatial entities in images in accordance with one or more embodiments.

FIG. 8 illustrates an example computing device 800 that can be configured to implement the tagging geospatial entities in images in accordance with one or more embodiments. Computing device 800 can be, for example, map display device 100 of FIG. 1, or can implement any of the techniques and processes discussed herein.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or I/O device(s) 808 can be included as part of, or alternatively may be coupled to, computing device 800. Bus 810 represents one or more of any of several types of bus structures, including a memory bus or memory controller, a peripheral bus, an accelerated graphics port, and a processor or local bus using any of a variety of bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors, cause the one or more processors to:
   identify locations of geospatial entities in a map image;
   access a record of entity model-to-tag mappings to identify tag data corresponding to a geospatial entity in the map image, wherein to identify the tag data comprises selecting the tag data from multiple different tag data associated with multiple different sources based at least in part on priority levels associated with the multiple different sources;
   display, on the map image and in addition to the geospatial entity in the map image, an outline surrounding the location of the geospatial entity corresponding to the tag data; and
   display, on the map image, the tag data.

2. One or more computer storage media as recited in claim 1, wherein the one or more processors are part of a mobile device, wherein the map image is changed to a new map image when the mobile device is moved, and wherein the identification, access, and display is repeated for the new map image.

3. One or more computer storage media as recited in claim 1, wherein to display the tag data is to display the tag data within the outline.

4. One or more computer storage media as recited in claim 1, the instructions further causing the one or more processors to repeat the identification, access, and display for each of multiple different types of map images.

5. One or more computer storage media as recited in claim 1, wherein the determination of which of the multiple different tag data is to be displayed on the map image is based at least in part on votes received from multiple different users.

6. One or more computer storage media as recited in claim 1, wherein to display the tag data is to display tag data from a trusted source differently than tag data from an untrusted source.

7. One or more computer storage media as recited in claim 1, wherein to access the record is to obtain a link to the tag data from the record, and access a source identified by the link to retrieve the tag data to be displayed.

8. One or more computer storage media as recited in claim 1, wherein the record of entity model-to-tag mappings includes a global record of mappings that are accessible to all users, and a private record of mappings that are accessible only to particular users.

9. A method comprising:
receiving a user selection of a location on a map image;
accessing a record of entity models to identify an entity model corresponding to a geospatial entity at the location on the map image;
displaying, in addition to the geospatial entity on the map image, an outline of the geospatial entity on the map image;
identifying tag data for the geospatial entity, wherein identifying the tag data comprises selecting the tag data from multiple different tag data associated with multiple different sources based at least in part on priority levels associated with the multiple different sources;
displaying the tag data on the map image; and
creating a record mapping the tag data to the entity model.

10. A method as recited in claim 9, wherein identifying the tag data comprises receiving user input data that is the tag data.

11. A method as recited in claim 9, further comprising:
identifying locations of other geospatial entities on the map image;
accessing a set of records, the set of records including the record mapping the tag data to the entity model, to identify tag data corresponding to the other geospatial entities;
displaying, on the map image, outlines surrounding the locations of the geospatial entities corresponding to the tag data; and
displaying, on the map image, the tag data.

12. A method as recited in claim 9, wherein the creating comprises:
creating the record only if the record does not already exist; and
if the record does already exist then adding the tag data to the record and validating the tag data against tag data from a trusted source if the trusted source exists.

13. A method as recited in claim 9, wherein creating the record comprises creating the record as part of a global set of records.

14. A method as recited in claim 9, wherein creating the record comprises creating the record as part of a set of private records.

15. An image display device comprising:
a tag generation module configured to:
receive a user selection of a location on a map image;
display, on the map image and in addition to a geospatial entity in the map image, an outline of the geospatial entity corresponding to the location;
receive tag data for the geospatial entity, wherein the tag data is selected from multiple different tag data associated with multiple different sources based at least in part on priority levels associated with the multiple different sources;
display the tag data on the map image and at least partially within the outline; and
create a record mapping the tag data to a model of the geospatial entity; and
a map display module configured to:
identify locations of geospatial entities in the map image; and
display, for each of one or more of the geospatial entities, in addition to the geospatial entity both an outline of the geospatial entity on the map image and tag data corresponding to each of the one or more geospatial entities, wherein the tag data for one or more tags is obtained from another device identified in a link of the tag.

16. An image display device as recited in claim 15, wherein one of the one or more geospatial entities is the geospatial entity corresponding to the location.

17. An image display device as recited in claim 15, wherein the map display module is further configured to:
determine when multiple different tag data corresponds to a same one of the one or more geospatial entities; and
determine, based at least in part on votes received from multiple different users, which of the multiple different tag data is to be displayed on the map image for the one of the one or more geospatial entities.

18. An image display device as recited in claim 15, wherein the tag generation module is further configured to:
determine whether the record is to be created in a global record of mappings that are accessible to all users, or in a private record of mappings that is available only to particular users.

19. An image display device as recited in claim 15, wherein the tag generation module is further configured to:
display the tag data for the geospatial entity in different images that include the geospatial entity; and
allow the tag data to be transferred to a different image display device displaying the map image or a different map image.

* * * * *